United States Patent [19]

Kupersmit

[11] Patent Number: 4,663,207
[45] Date of Patent: May 5, 1987

[54] MULTIPLY CORRUGATED WALL CONSTRUCTION

[76] Inventor: Julius B. Kupersmit, 200 W. 12th St., New York, N.Y. 10014

[21] Appl. No.: 752,675

[22] Filed: Jul. 8, 1985

[51] Int. Cl.⁴ .............................................. B32B 29/08
[52] U.S. Cl. ...................................... 428/119; 220/441; 229/3.5 R; 229/DIG. 2; 428/186
[58] Field of Search .................. 206/594; 52/815, 821; 220/441, 443; 229/23 C, 23 R, DIG. 2, 3.5 R; 428/59, 61, 119, 120, 309.9, 184, 186

[56] References Cited

U.S. PATENT DOCUMENTS

| | | | |
|---|---|---|---|
| 1,847,216 | 3/1932 | Hubbard . | |
| 2,020,639 | 11/1935 | Grayson et al. | 154/44 |
| 2,160,221 | 5/1939 | Masters et al. | 220/14 |
| 2,181,483 | 11/1939 | Greve | 229/DIG. 2 |
| 2,221,309 | 11/1941 | Gazelle | 154/45 |
| 2,423,870 | 7/1947 | Blessing | 154/129 |
| 2,454,719 | 11/1948 | Scogland | 428/119 |
| 2,706,590 | 4/1955 | Bergstein | 229/14 |
| 2,972,440 | 2/1961 | Munroe | 229/23 C |
| 3,041,219 | 6/1962 | Steck | 154/45 |
| 3,289,423 | 12/1966 | Berner | 428/119 |
| 3,323,963 | 6/1967 | Summers | 156/192 |
| 3,536,245 | 6/1968 | Palmer | 229/14 |
| 3,910,485 | 10/1975 | Wandel | 220/441 |
| 3,929,272 | 12/1975 | Bowles | 229/23 C |
| 4,148,396 | 4/1939 | Gardner | 206/521 |
| 4,360,145 | 11/1982 | Wilcox | 229/1.5 R |
| 4,424,753 | 1/1984 | Eatherton | 428/119 |

FOREIGN PATENT DOCUMENTS

| | | | |
|---|---|---|---|
| 0933781 | 4/1948 | France | 220/441 |
| 1400414 | 7/1975 | United Kingdom | 220/441 |

Primary Examiner—William Price
Assistant Examiner—Jimmy G. Foster
Attorney, Agent, or Firm—Charles E. Temko

[57] ABSTRACT

A multiply corrugated paper wall construction having increased resistance to bowing or flexing under loads applied in a plane normal to the plane of the wall. The construction includes the provision of one or more rigid reinforcing members of elongated non-planar cross section implanted and glued into corresponding recesses in at least one of a plurality of laminae comprising the construction. In a preferred embodiment, the reinforcing member is of "T" shaped cross section with the leg of the "T" lying in a plane normal to the plane of the wall. A second embodiment, useful where greater strength is required, includes a reinforcing member having a "W" shaped cross section.

5 Claims, 5 Drawing Figures

U.S. Patent    May 5, 1987    4,663,207
FIG. 1.
FIG. 2.
FIG. 3.
FIG. 4.
FIG. 5.
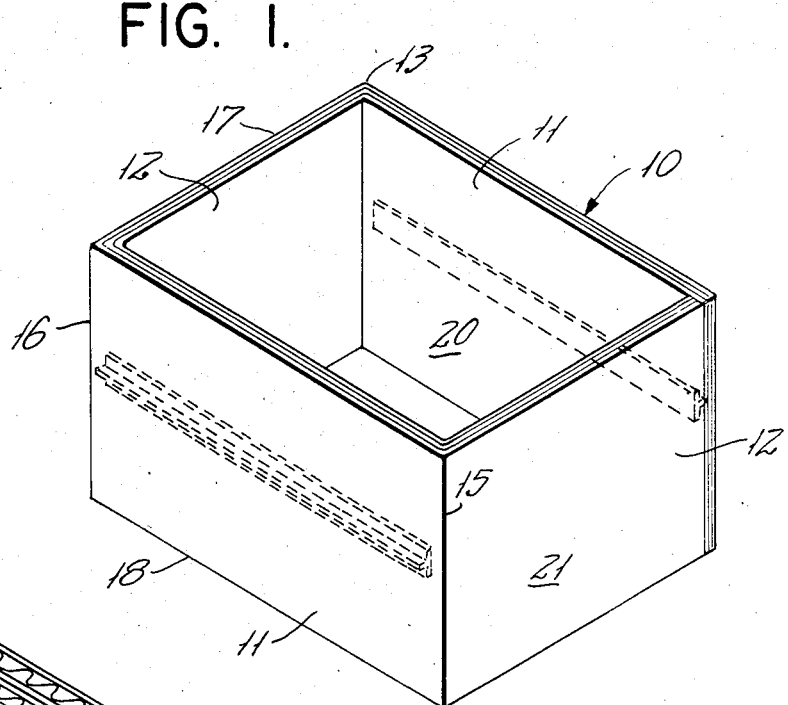
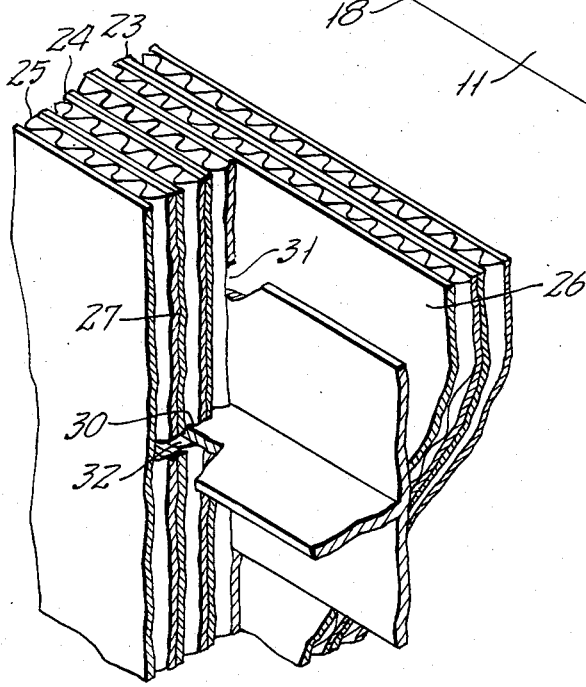
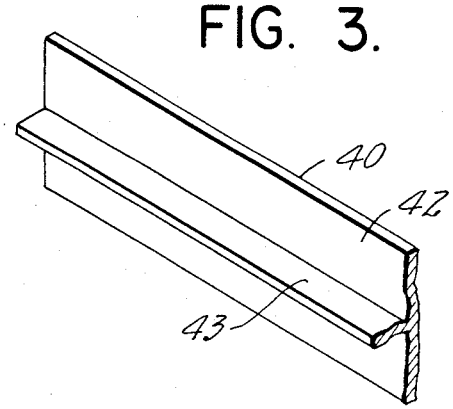
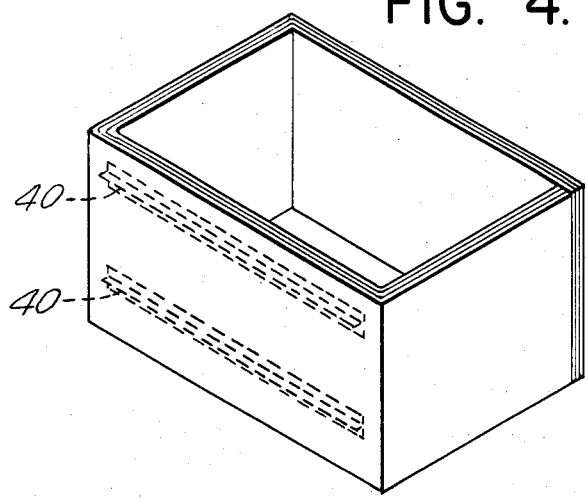
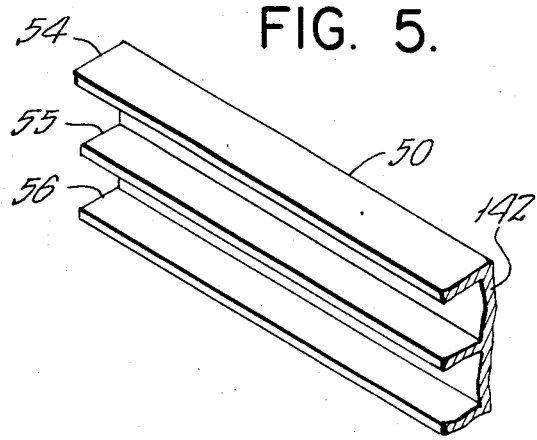

MULTIPLY CORRUGATED WALL CONSTRUCTION

BACKGROUND OF THE INVENTION

This invention relates generally to the field of corrugated paper construction, and more particularly to an improved multiply corrugated wall structure, the mechanical strength of which has been significantly improved by the addition of metal inserts of ribbed cross section, whereby the resistance to flexing in a direction normal to the plane of the wall is enhanced.

In the manufacture of cardboard boxes and containers, particularly those of reusable type, it is commonplace to provide a so-called "triple wall" reinforcement at critical areas, such as the corners of the container to increase compressive strength thereat, as is necessary where a plurality of loaded containers are placed in stacked relationship. It is also known, particularly in the case of collapsible reusable containers to add a reinforcing liner providing additional resistance to side wall bulging when shipping heavy particulate materials. Such liners add additional thickness to the side walls of the container. While effective in the case of particularly dense particulate material, even such additional structure may be inadequate. It is, of course, possible to add additional thicknesses of material to the liner element but only at the expense of considerably reducing the usable volume of container and making it difficult to store the liner in the case of collapsible structures.

SUMMARY OF THE INVENTION

Briefly stated, the invention contemplates the provision of an improved corrugated paper wall construction, in which the above mentioned disadvantages have been substantially eliminated. To this end, there is provided an improved multiply wall construction in which metallic reinforcing elements have been incorporated to provide additional resistance to flexing in response to stresses applied in planes normal to the plane of corrugated material. The reinforcing elements are formed from extruded material formed to an angular cross section, and are glued into corresponding recesses formed in the laminated corrugated material so as to be substantially concealed beneath the outermost laminae. The laminated construction may be formed as relatively large sheets and cut to require sizes without difficulty using saw blades capable of cutting the metallic elements along with the corrugated cardboard laminae. Alternatively, the construction may be part of a collapsible reinforcing linear element normally positioned within a collapsible shipping container to strengthen side wall resistance to bowing. In such case, the extruded material will be cut to proper length and implanted in the paper stock to permit the formation of fold lines at the corners of the reinforcing element.

In a preferred embodiment, the reinforcing element is of extruded aluminum and forms a T-shaped cross section. Where greater resistance to flexing or bowing in a plane normal to the plane of the wall is desired, the extrusion may have a "W" shaped cross section. Preferably, the reinforcing elements are positioned within medial laminae so as to be totally concealed from view and protected against damage. The recesses in which the reinforcing elements are disposed can be formed using a combination cutting and abraiding tool.

BRIEF DESCRIPTION OF THE DRAWING

In the drawing, to which reference will be made in the specification, similar reference characters have been employed to designate corresponding parts throughout the several views.

FIG. 1 is a view in perspective of the embodiment of the invention.

FIG. 2 is an enlarged fragmentary view in perspective of the embodiment.

FIG. 3 is a view in perspective of a reinforcing element forming a part of the disclosed embodiment.

FIG. 4 is a view in perspective corresponding to that seen in FIG. 1 but showing a modified form of the invention.

FIG. 5 is a view in perspective corresponding to that seen in FIG. 3 showing a modified form of the embodiment.

DETAILED DESCRIPTION OF THE DISCLOSED EMBODIMENT

In accordance with the first embodiment of the invention, the device, generally indicated by reference character 10, is illustrated in the form of a foldable liner used in conjunction with conventional rectangular shipping containers for the purpose of adding stiffness in a horizontal plane whereby to resist bowing and flexing under stress imparted by heavy loads. It will be understood by those skilled in the art that the construction may be incorporated directly into the wall of the container itself (not shown) in the event that no liner is used.

The device 10 includes first and second side walls 11, and first and second end walls 12 interconnected at the corners by fold lines 13, 14, 15 and 16, to define a continuous upper edge 17, a continuous lower edge 18, an inner surface 20 and an outer surface 21.

Each of the walls 11 and 12 is formed from plural laminae, 23, 24, and 25 of corrugated multiply board which are glued together in the areas indicated by reference characters 26 and 27, in a manner well-known in the art. The medial lamina 24 is provided with an elongated T-shaped recess 30, including a first portion 31 parallel to the plane thereof, and a second portion 32 perpendicular to the plane thereof. The length of the recess is such that it terminates just short of an adjacent fold line 13–16, to permit the side end walls to be foldably interconnected. For mass production purposes, the recess 30 is preferably formed by using a rotating abraiding and cutting tool, the cross section of which corresponds to that of the recess.

Disposed within the recess 30 is a rigid reinforcing element 40 of corresponding T-shaped cross section, including a cross member 42 and a leg member 43, the element 40 being glued in position in the recess 30 at the time of assembly of the laminae 23-25, and using the same glue or adhesive. This assembly permits the element 40 to be completely concealed within the plane of a respective wall, and assures the presence of completely smooth surfaces 20 and 21.

When the device 10 is in use, stresses will normally be applied against the inner surfaces 20 which would tend to bow outwardly the walls 11 and 12. This is resisted by the leg member 43 of each of the elements 40 implanted in the walls 11 and 12 to a far greater degree than is possible in the case of corrugated board alone.

Ideally, the element 40 is formed as a continuous extruded length from tempered aluminum or other light-weight metals. It is also possible to form the elements from high tensile strength synthetic resinous materials which can be likewise extruded or injection molded.

Turning now to the alternate form of the invention, generally indicated by reference character 50, and illustrated in FIG. 5, parts corresponding to those of the principal embodiment have been designated by similar reference characters with the additional prefix "1".

In the alternate form, the reinforcing element 140 is a W-shaped cross section, including three individual legs 54, 55 and 56 which provide additional resistance to flexing. The recess 130 is of corresponding cross section to accommodate the element 140.

As illustrated in FIG. 4, it is possible to have several elements 40 incorporated into a single wall where still greater reinforcement is necessary. Normally, this will be practical where the containers are of substantial dimensions.

I wish it to be understood that I do not consider the invention limited to the precise details of structure shown and set forth in this specification, for obvious modifications will occur to those skilled in the art to which the invention pertains.

I claim:

1. An improved corrugated paper multiply wall construction comprising: a plurality of corrugated paper laminae, said laminae being glued together to form a multiply wall; said wall having an elongated recess therein of generally rectangular configuration, said recess having a depth of dimension less than the total thickness of said multiply wall, and an elongated unitary reinforcing element of external cross-sectional configuration corresponding to that of said recess, said reinforcing element having an outer surface glued within said recess whereby to impart additional stiffness to said multiply wall against flexing in a direction perpendicular to the plane of said wall; said reinforcing element being of T-shaped cross section including a leg portion and a cross portion; said leg portion being positioned within said recess with the plane thereof perpendicular to the plane of said wall.

2. Wall construction in accordance with claim 1 in which said reinforcing element is formed as a metallic extrusion.

3. Wall construction in accordance with claim 1 in which said reinforcing element is formed as an extrusion of relatively stiff synthetic resinuous material.

4. Wall construction in accordance with claim 1 in which said reinforcing element is disposed completely beneath the outer surface thereof.

5. An improved corrugated paper multiply wall construction comprising: a plurality of corrugated paper laminae, said laminae being glued together to form a multiply wall; said wall having an elongated recess therein of generally rectangular configuration, said recess having a depth of dimension less than the total thickness of said multiply wall; and an elongated unitary reinforcing element of external cross-sectional configuration corresponding to that of said recess, said reinforcing element having an outer surface glued within said recess whereby to impart additional stiffness to said multiply wall against flexing in a direction perpendicular to the plane of said wall; said reinforcing element being of W-shaped cross section including plural leg portions and a cross portion, said leg portions being positioned within said recess with the planes thereof perpendicular to the plane of said wall.

* * * * *